Sept. 30, 1958 W. T. HEYER 2,854,023
VALVE
Filed July 15, 1954
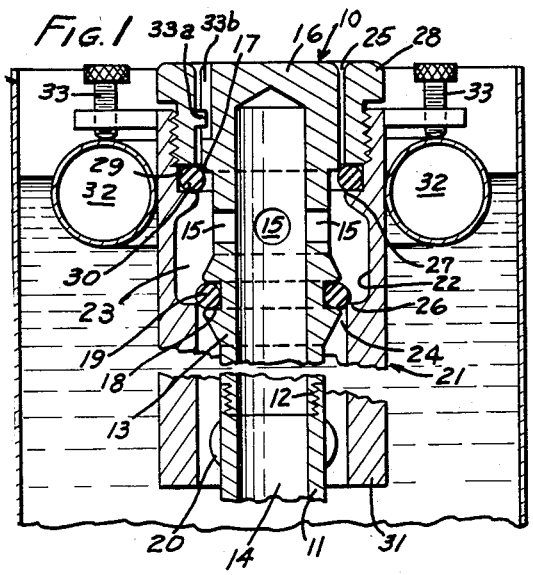
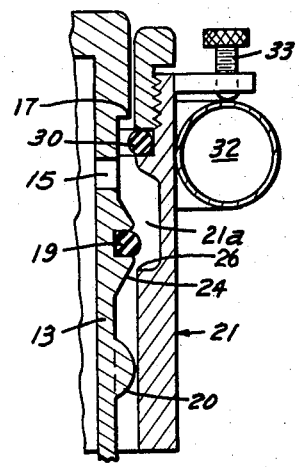
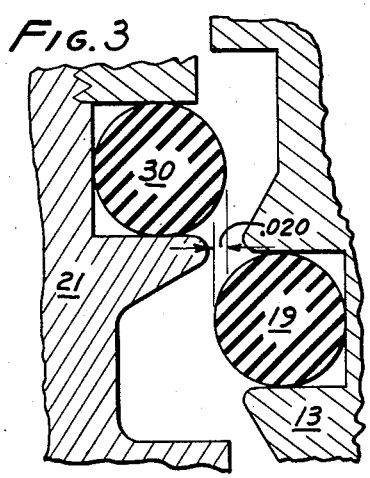
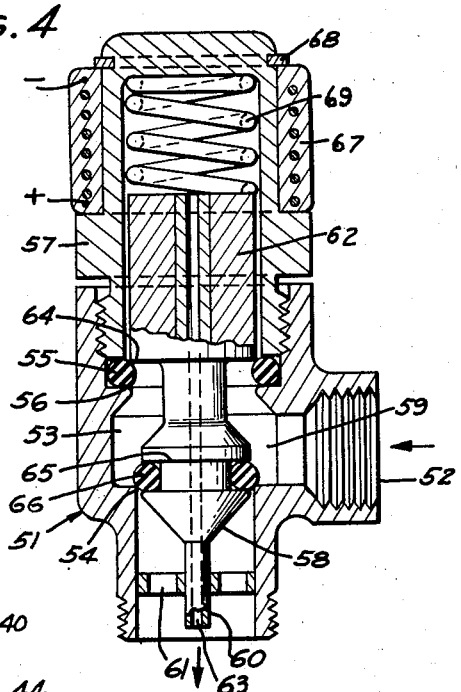
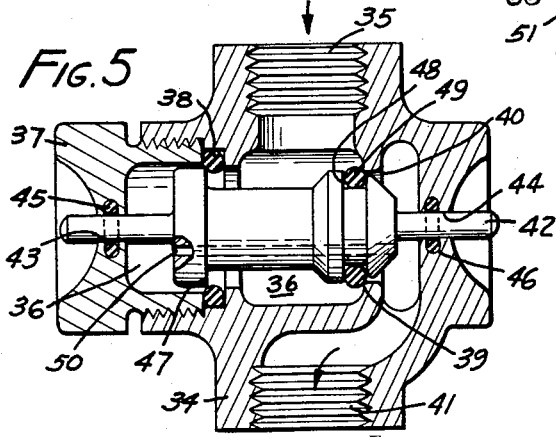
INVENTOR.
WILLIAM T. HEYER
BY
D. Gordon Angus
ATTORNEY.

2,854,023

VALVE

William T. Heyer, Pasadena, Calif.

Application July 15, 1954, Serial No. 443,647

3 Claims. (Cl. 137—432)

This invention relates to valves, and in particular to a valve for controlling fluid flow by means of an axial shifting of parts of the valve.

An object of the invention is to provide a balanced valve which will open and close without substantial sliding friction, thereby requiring smaller actuating forces than are needed for conventional valves having parts with a sliding fit.

This invention is carried out by providing an outer body having a cavity therein. An axially shiftable stem is fitted in this cavity so as to form a flow chamber between said stem and body. The outer body has a passage therein for permitting fluid to escape from this flow chamber, and the stem is so disposed and arranged as to shift relative to this passage.

A feature of the invention resides in the provision of two O rings in the cavity of the outer body, one of these O rings being mounted to the stem, and the other to the outer body. Two complementary ring seats are provided, one on the stem and the other on the body so that in one relative position of the stem and outer body the two rings are simultaneously seated, thereby closing the passage and retaining fluid in the cavity.

In another position of the stem which results from the relative shifting of the stem and outer body, both rings and seats will be separated, thereby opening the passage in the outer body to fluid flow. Means are provided for supplying fluid whose flow is to be controlled into the flow chamber. The flow of fluid through the valve is possible only when the stem is in such a position that the rings are off the seats and the passage from the flow chamber is open.

A related feature resides in means for venting the opposite sides of the O rings to substantially the same fluid pressures, thereby providing a balanced valve.

The above and other features of this invention will be fully understood from the following detailed description and the accompanying drawings of which:

Fig. 1 is an elevation partly in cross section, of a valve according to the invention installed in a flushing tank, said valve being in a closed position;

Fig. 2 is a view in cross section of a fragment of the valve of Fig. 1 in an open position;

Fig. 3 is fragmentary view in cross section of the valve of Fig. 1 illustrating a preferred dimensional relationship between the O rings;

Fig. 4 is a cross-section of an optional form of valve according to the invention; and Fig. 5 is a cross section of still another optional form of valve according to the invention.

In Fig. 1 there is shown a preferred form of the valve particularly adapted to controlling liquid level in a tank. The valve 10 is conveniently fixed to a water supply conduit 11 which rises vertically in the tank. The attachment of the valve to the conduit is by means of a threaded joint 12 on the lower end of a valve stem 13. This stem 13 comprises a generally cylindrical body having an internal bore 14 for the passage of liquid. Supply ports 15 are drilled through the side of the stem. The upper end of the stem is capped as at 16, it being understood that this cap is preferably integral with the valve stem for simplicity in manufacture, although it could be a separate threadably attached member if desired.

The cap section 16 has a larger outer diameter than the valve stem itself, and provides a ring seat 17 which comprises a shoulder near the junction of the narrow portion of the valve stem and the cap section. On the opposite side of the supply ports 15 from the ring seat 17, there is a ring groove 18 in the outer surface of the stem. This ring groove accommodates an O ring 19 which is seated therein.

On the conduit 11 there are provided guide vanes 20 which may be metal protuberances. These act as guides for a purpose to be described. These vanes may be placed either on the conduit or on the valve stem as desired.

An outer body 21 is provided which surrounds the stem and cap. The inner wall 22 of the outer body forms a cavity in which the stem is disposed. This leaves an annular flow chamber 23 between the stem and the outer body. A passage 24 forms an escape means from the flow chamber. The stem 13 is slidable relative to this passage and preferably extends somewhat into it. Another escape passage 25 is provided between the outer body and the cap section 16.

The outer body has an inwardly directed shoulder forming a ring seat 26 for sealing with the O ring 19. A shoulder 27 on the outer body within the cavity, in cooperation with a threadably engaged adjustment member 28 forms a ring groove 29 within which there is placed another O ring 30 which can bear against the ring seat 17. The threadable engagement between the adjustment member 28 and the outer body permits some compression of the O ring 30 to slightly adjust its axial position in the groove.

The O rings are shown as having a circular cross section. However there are other cross sections which are equally serviceable so long as a continuous line of contact can be made between the O rings and the ring seats. The O rings may conveniently be made of any material suitable for such purposes, such as the well-known neoprene, Teflon, or other resilient substances resistant to the fluid being controlled.

It will now be seen that the O rings are placed within the cavity of the outer body, one being so disposed and arranged as to close the escape passage 24 in one position of the outer body relative to the stem, while the other closes passage 25 in the same valve position.

A skirt 31 is made integral with the outer body 21 and extends downwardly so as to surround the valve stem 13, and preferably also a length of the conduit 11. This skirt 31 makes a loose sliding fit with the guide vanes 20 for the purpose of limiting the angular play between the valve stem 13 and the outer body 21.

For use in a tank where this valve is used as a means for maintaining liquid level, a float member 32, which prefably has a horizontally-extending cross-section such as a ring concentric with the valve itself, is attached to the outer body 21. The float may have adjustment means such as set screw 33 for shifting its position up and down with respect to the outer body.

The valve of Fig. 2 is in an open position. It will be observed that the cross-section of the flow passage between the stem and the outer body while the valve is open may be depicted as a surface of revolution which is substantially frusto-conical. For providing a smooth flow of water out of the flow chamber it has been found that the area of this frusto-conical flow section should approximately equal the cross-sectional area of the supply means. That is, the total area of supply ports 15 should be equal to the area of the frusto-conical flow section. In order to attain this equivalence, it has been found that for valves of this type the relative axial movement between the outer body and the stem will stand in the numerical ratio to the diameter of the main supply line (such as bore 14) in the approximate ratio of 1:4. That is, for handling water supplied in a ¼ inch conduit the outer body should be shiftable approximately 1/16".

Fig. 3 shows a preferred relationship for the positioning of O rings 19 and 30. For convenience in assembly and for effectiveness in an operation, it has been found that the innermost point of the ring 30 and the outermost point of the ring 19 should overlap radially relative to the axis of the stem by approximately .020".

The usual O ring materials for valves of this type have sufficient resiliency to permit the assembly of a valve with these relative dimensions without the need for undue force or unusual assembly techniques. This provides a satisfactory overlap of seats and rings to give a good sealing action.

A tongue 33a on the outer body and a slot 33b in the stem guide the relative movement of these members.

The assembly of this valve will be evident from an examination of Fig. 1. The O rings are first inserted in their ring grooves. Then the outer body may simply be slid on to the inner body by forcing the outer body with its O ring over the valve stem. There will be sufficient resiliency in the rings to permit this movement. This completes the assembly of the valves.

The upper passage 25 will generally be at least .005" in width in order that this assembly may conveniently be made, as well as for pressure balancing purposes presently to be described. Other variations of this preferred construction will be evident to persons skilled in the art, such as making the outer body 21 of the single piece by simply cutting the ring groove 29 in a sleeve so as to have the substantially same contour as the two-piece outer body shown in the figures.

In Fig. 5 there is shown an embodiment of the invention which is useful for controlling fluids such as compressed air by the snap action of a pin. The fluid is supplied to a flow chamber between the stem and the outer body. According to this construction an outer body 34 has a supply port 35 in one side thereof and has a cavity 36 within the body which is terminated at one end thereof by a plug 37 threadably fitted to the outer body so as to compress an O ring 38 therebetween. A ring seat 39 is provided at the end of the cavity away from plug 37 and leaves an escape passage 40 from the cavity leading to a discharge conduit 41. A stem 42 is slidably fitted in a shaft passage 43 in plug 37 and in another shaft passage 44 in the outer body. Both ends of the stem will protrude from the valve. Seal rings 45 and 46 are provided for sealing the space around the ends of the stem.

A ring seat 47 is formed on the stem which can make a contact with O ring 38 in the outer body at one position of the stem. A ring groove 48 with an O ring 49 therein is provided on the stem, this ring being engageable with the ring seat 39 on the outer body. A bleed passage 50 extends through the stem and interconnects portions of the valve stem outside the seat 47 and the O ring 49, so that the outside portions of both rings away from the flow chamber are exposed to substantially the same pressure. The valve stem fits in the cavity so that an escape passage also exists between the stem and outer body to the left end of the cavity as seen in Fig. 5.

In Fig. 4 there is shown a solenoid operated valve having an outer body 51 which is side-tapped by a supply passage 52. Inside this outer body there is a cavity 53 which has a ring seat 54 at one end. In this cavity there is also disposed an O ring 55 held in place between a shoulder 56 and a plug 57.

A stem 58 passes through the cavity so as to leave a flow chamber 59 between the stem and the outer body, into which the supply passage discharges fluid, the flow of which is to be regulated. The stem has a rod-like portion 60 which is slidably mounted in a guide 61 so as to center the stem. At the upper end 62 of the shaft, a loose fit is made inside the plug 57 so as to continue the cavity therebetween and provide another escape passage in the top of the cavity as shown in Fig. 4.

The stem has a bleed passage 63 drilled therethrough from end to end so as to vent both escape passages outside the flow chamber to the same fluid pressure. A ring seat 64 is formed on the stem so as to be engageable with O ring 55, and a groove 65 provides means for seating another O ring 66 which can engage ring seat 54 on the outer body. The rings and seats on the outer body and on the stem are equidistantly spaced so that they engage a complementary seat and O ring simultaneously.

The upper portion of the stem is made of a magnetizeable material, and a coil 67 surrounds the plug 57. This coil can be connected to a source of electricity to create a magnetic field. A keeper 68 holds the coil in place.

A coil spring 69 is disposed between the plug 57 and the stem so as to force the stem in a downward direction and close the escape passages.

The operation of the valve of Fig. 1 to control the flow of liquid into a tank will now be described. The valve is first installed by attachment to the conduit 11 which preferably rises vertically in the tank and holds the valve in that position. Since there is no net upward force on the outer body when the tank is empty, the valve will assume the position shown in Fig. 2 in which the outer body has dropped down so as to open the escape passage 24 by moving the ring seat 26 away from the O ring 19. At the same time O ring 30 will have also moved down and away from the ring seat 17. The tongue 33a bottoms in the slot 33b and thus limits the downward movement of the outer body.

When the valve is in this open position, liquid passes upward through the bore 14, through escape passages 15 into the annular chamber 23, and then largely downward through escape passage 24, although some flow occurs through the smaller upper escape passage 25. The water is then guided smoothly and quietly between the skirt 31 and the conduit 11 into the tank. As the tank fills and the water rises to the desired upper level, the float 33 is buoyed up so as to lift the outer body 21. This movement lifts the ring seat 26 against the O ring 19 and also moves the O ring 30 against the ring seat 17, thereby closing the flow chamber, and preventing further fluid flow.

The spacing between the ring seats and the O rings should be such that the two ring seats contact their respective O rings substantially simultaneously. For this reason the adjustment member 28 is provided. By adjusting the tightness of this member, the upper O ring 30 can be compressed slightly so as to move its point of contact with the ring seats 17 axially by a few thousands of an inch. If the outer body is carefully manufactured, a change of position of a few thousandths of an inch will be quite adequate for this adjustment. Therefore the spacing between the contact portions of the rings and ring seats on the inner valve stem and on the outer body are substantially equal.

After the spacing of seats and rings is properly adjusted, or initially built into the valve, subsequent on and off operations will proceed without further adjustment. For example, assuming that the water is dumped from the tank by ordinary flushing valves, then the float drops of its own weight, as does the outer body. The downward movement of the outer body is limited by the tongue 33a which abuts against the bottom of slot 33b when the limit of movement has been reached. At that time, of course, the flow of water begins again through passages 24 and 25.

It will be noted that the outer body is constructed so that water pressure in the flow chamber 23 gives no net force component on the outer body so as to move it of its own accord. This is accomplished by providing substantially equal cross-sections at each end of the outer body.

When the tank refills it will lift the float, and then the valve will be shut off. The outer ends, away from the flow chamber, of the passages 24 and 25 are both exposed to substantially atmospheric pressure at all times. The import of this is that the valve is balanced, since the internal forces are also substantially balanced. Then only a very small force is necessary to move the outer body. In fact, experiments with this valve indicate that the force required to move a properly designed outer body is generally less than one pound per one hundred pounds of supply line pressure, depending, of course, on manufacturing tolerances.

As the float and outer body move upward, there is no necessary contact between the outer body and the stem. The first contact is made between the seats and the rings, which simultaneously join and shut off the fluid flow.

The total axial movement between the outer body and the stem is relatively small, being in inches approximately one-fourth the diameter of the supply conduit. This amount of movement will open the escape passage so that its frusto conical flow section will have substantially the same area as that of the supply conduit. This represents the best design for smooth fluid flow.

It will also be appreciated that the angular play between the outer body and the inner valve stem is restricted by the interaction of the skirt 31 and the guide vanes 20. While the play between the guide vanes and the skirt may be comparatively large, the disposition of the guide vanes at some distance from the valve itself will still result in a significant limitation of the relative movement of the valve parts at the O rings.

The valve of Fig. 5 will be found particularly useful in the control of compressed air for blower nozzles, inasmuch as only a light force is required to move the valve for control of flow. The operation of this valve is substantially the same as that of the valve of Fig. 1 in that fluid is supplied to a flow chamber, and is held in that flow chamber so long as the O rings are seated on the seats. When the stem is pressed to the left as shown, the seat 47 is moved away from O ring 38, and O ring 49 is moved from seat 39 therefore fluid can flow unimpeded from the supply part through the passage 40 and out the discharge conduit 41. At the same time fluid will flow between the stem and the O ring 38 to the upper part of the cavity as shown in Fig. 4, and then down through the bleed passage and into the discharge conduit 41. It will be observed that the pressure on the extreme ends of the stem is the same and there is no net force component in either direction. Pressing the end of the stem so as to move it to the right joins the rings and seats and closes the valve.

The valve of Fig. 4 is adapted for solenoid operation, and is structurally similar to the valves of Figs. 1 and 5. It is normally held in a closed position by spring 69. Energizing the coil winding 67 will draw the magnetizable upper end 62 of the stem against the spring and open the valve. The valve remains open while the winding is energized, and will close again when the current is turned off.

The design criteria for all the valves are similar. That is, the dimensions in the flow chamber should be such that there is no net tendency of the outer body to move because of the fluid pressure. Also, the O rings should be installed so that fluid pressure tends to force them into their grooves, instead of to extrude them therefrom. Also, the relative sizes of the escape passages and supply parts will be the same as that described for the valve of Fig. 1.

By this invention there is provided a balanced valve which controls fluid flow with a smaller movement and less force than are needed for conventional valves. The lesser force is partly due to the balancing of the forces in both directions, and partly to the general absence of sliding fits between relatively movable parts.

This invention is not to be limited by the embodiments shown in the drawings and described in the description, which are given by way of example and not limitation, but only in accordance with the scope of the appended claims.

I claim:

1. A valve comprising an outer body having a cavity therein and an escape passage through said body from the cavity; a valve stem slidably disposed in said cavity so as to form a flow chamber between the outer body and the valve stem; said valve stem having an axial bore and ports through the side thereof interconnecting said axial bore with the flow chamber as a means of fluid supply for the flow chamber; a first ring seat around the valve stem; a second ring seat on the outer body within the cavity; a first O ring fixed to the outer body within the cavity; a second O ring fixed to and surrounding the valve stem, the side of each O ring away from the flow chamber being exposed to substantially the same fluid pressure, the first ring seat and first O ring being adapted to join each other in one relative position of the valve stem and outer body, and being so disposed and arranged as to stop fluid flow through the escape passage in said one position, the second ring seat and second O ring being adapted to join each other at the same one relative position of the valve stem and outer body, whereby fluid flow from the flow chamber and through the valve is prevented in said one position and whereby shifting said outer body and valve stem relative to each other unseats the O rings from the ring seats and permits fluid flow through the valve.

2. A valve according to claim 1 in which the valve stem leaves an escape passage at both ends of said flow chamber, a set of ring seats and O rings being so disposed and arranged at each of said escape passages whereby the ring seats and O rings of each set simultaneously join to prevent fluid flow through the passages in one relative position of the outer body and valve stem.

3. A valve according to claim 2 adapted for use in a tank wherein an upright conduit supplies fluid to said bore, guide vanes affixed to said conduit, a skirt affixed to the outer body so as to surround the guide vanes whereby to limit the angular play of the outer body relative to the valve stem, and a float member adapted to lift the outer body by means of its buoyancy in the fluid whose flow is controlled by the valve.

References Cited in the file of this patent

UNITED STATES PATENTS

| | | |
|---|---|---|
| 258,500 | Storer | May 23, 1882 |
| 537,201 | Haldeman | Apr. 9, 1895 |
| 1,320,944 | Thoens | Nov. 4, 1919 |
| 1,707,866 | McEwan | Apr. 2, 1929 |
| 2,271,419 | Egan | Jan. 27, 1942 |
| 2,485,504 | Morgan | Oct. 18, 1949 |
| 2,660,834 | MacGlashan | Dec. 1, 1953 |
| 2,752,941 | Mitchell | July 3, 1956 |